May 6, 1969   KARL-HEINZ OTT ET AL   3,442,979
THERMOPLASTIC-ELASTIC MOULDING COMPOSITIONS WITH IMPROVED
NOTCHED BAR IMPACT STRENGTH
Filed July 14, 1964
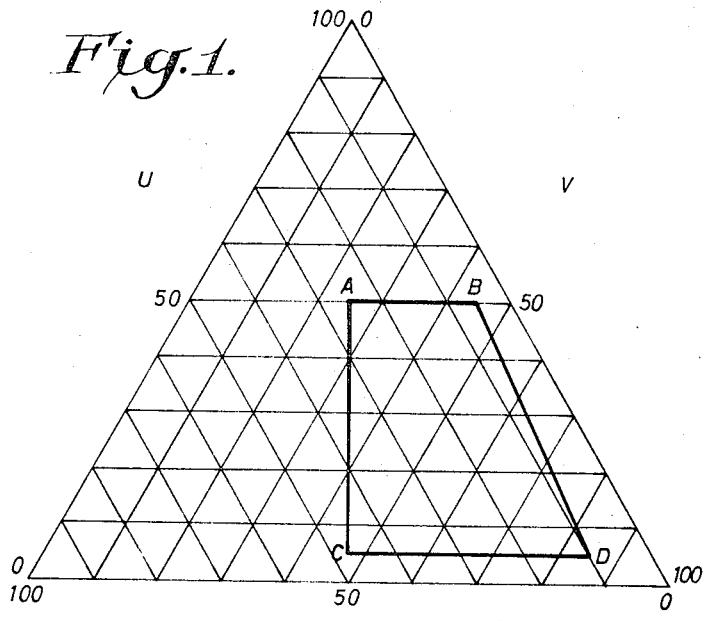
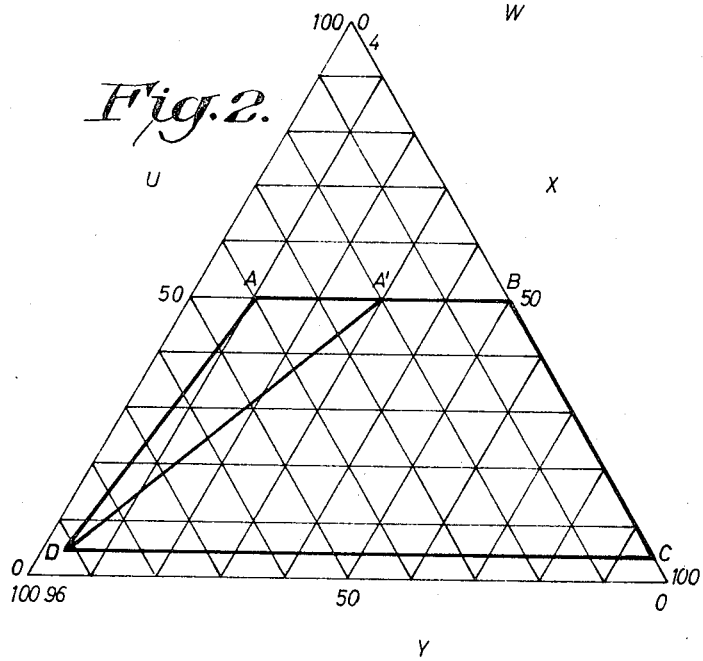
INVENTORS:
KARL-HEINZ OTT, KARL-HEINRICH KNAPP, KARL DINGES, HARRY RÖHR.
BY
*Connolly and Hutz*
ATTORNEYS United States Patent Office 3,442,979
Patented May 6, 1969

3,442,979
THERMOPLASTIC-ELASTIC MOULDING COMPOSITIONS WITH IMPROVED NOTCHED BAR IMPACT STRENGTH
Karl-Heinz Ott, Cologne-Stammheim, Karl-Heinrich Knapp, Leverkusen, Karl Dinges, Cologne-Stammheim, and Harry Roehr, Cologne, Germany, assignors to Farbenfabriken Bayer Aktiengesellschaft, Leverkusen, Germany, a German corporation
Filed July 14, 1964, Ser. No. 382,515
Claims priority, application Germany, July 30, 1963,
F 40,368
Int. Cl. C08f *19/18, 41/12*
U.S. Cl. 260—880           6 Claims

ABSTRACT OF THE DISCLOSURE

Compositions comprising, in polymerized form, 5 to 50% by weight polybutadiene, 25 to 85% by weight styrene and 10 to 47% by weight acrylonitrile produced by forming an emulsion containing polybutadiene, styrene and acrylonitrile within the above proportions, initiating polymerization with up to 30% of said emulsion and continuing said polymerization by adding the remaining 70% of the emulsion to the resulting polymerizate at a rate corresponding to the rate of polymerization. An extended composition thereof can be formed by adding additional styrene-acrylonitrile copolymer as a blend to provide a composition within the aforesaid proportions.

---

The present invention relates to thermoplastic-elastic moulding compositions of high impact strength, containing polymers formed from butadiene, styrene and acrylonitrile and to a process for their preparation.

It is known that thermoplastic moulding compositions having a high impact strength can be prepared by combining hard and brittle polymers such as polystyrene or styrene-acrylonitrile copolymers with soft, more or less rubber-like polymers such as butadiene-styrene or butadiene-acrylonitrile copolymers. To achieve a better compatibility of the extender-polymers, it has already been proposed to effect the polymerization of the resin-like components (e.g., styrene/acrylonitrile) as a graft-polymerisation, in the presence of an already polymerised rubber-like component (e.g., a butadiene homo- or copolymer). Depending upon the respective quantities employed these graft-copolymers have a resin-like, thermoplastic or rubber-like elastic character.

The technological properties of such graft-copolymers do not depend only upon the nature and amount of the monomers or polymers employed, but also, to a considerable extent, upon the type of process by which they have been prepared.

The usual process employed in carrying out such a graft-polymerisation is one in which the butadiene polymer latex is mixed with the whole of the styrene and acrylonitrile monomers, with addition of water and emulsifiers if desired. The mixture is then polymerised at the desired temperature by addition of a conventional polymerisation catalyst. This simplest process however has the following drawbacks:

(a) With large polymerisation batches, i.e. above all on the industrial scale, the temperature cannot be controlled during polymerisation;

(b) Owing to the great speed of the reaction, the polymerisation becomes uncontrollable. As a result a greater or lesser amount of the styrene and of the acrylonitrile polymerise by themselves because of the initially high monomer concentration and will not be grafted on the butadiene polymer. This "concurrently" polymerised portion frequently has an undesirably high molecular weight. This leads to a lack of uniformity from batch to batch, which is manifested, for example, in impaired and inequal workability, lack of gloss and variable mechanical properties.

To overcome these difficulties, it has been usual to add the monomers continuously to the butadiene polymer latex, so that no accumulation of larger quantities of monomer occurs and the polymerisation progresses at a uniform rate. Although the polymers so prepared have a better lustre and are easier to work than those obtained with the first-named process, their notched bar impact strength is considerably reduced.

It has now been found that graft-polymers having a very good notched bar impact strength, together with a good workability and good lustre, can be prepared from butadiene polymers, styrene and acrylonitrile by emulsion-polymerisation, when the polymerisation is at first initiated in a small portion of the emulsion to be polymerised, made up of the butadiene polymer and the monomer to be grafted, while the remainder of the emulsion to be polymerised, consisting of the butadiene polymer and the graft-monomer mixture, is continuously added to the starting batch at a rate corresponding to the rate of polymerisation, i.e., the consumption of the polymerisable components is substantially compensated by the addition of further polymerisable components (polybutadiene and graft-monomers). According to the embodiment preferred in practice, the polymerisation is initiated in a portion amounting to not more than 30% of the total emulsion of polybutadiene and graft-monomers and the remaining 70% of the emulsion is added continuously at a rate corresponding to the rate of polymerisation or of consumption. This method does not exclude the use of an initial aqueous phase containing only the catalyst system, and possibly the emulsifiers, to which the emulsion is continuously added. In this instance it will, of course, be necessary to take into account the initial spurt of the polymerisation reaction and to introduce the emulsion slowly.

Surprisingly, the present process leads to graft polymers whose characteristics significantly differ from those of the graft polymers obtainable by the known continuous polymerisation processes. In particular, the properties of graft polymers of this type are excellently reproducible.

A further great advantage of the process of the invention is that polybutadiene latices with average latex particles sizes below 0.4 micron may be employed as grafting-base. In contrast to this, the conventional "monomer-addition process" described at the beginning of this specification leads to good notched bar strength values of the graft polymers only when the average particle size of the polybutadiene latex is greater than 0.4 micron. Polybutadiene latices with particle sizes below 0.4 micron are, however, much cheaper and easier to produce than those with particle sizes above 0.4 micron. In the latter instance, a very long polymerisation period is required, which substantially increases process costs. (All particle size indications refer to measurements with the ultracentrifuge according to Svedberg.)

The present process gives the best results when the polymers consist of

|     |     | Percent |
| --- | --- | --- |
| (a) | Polybutadiene | 5–50 |
| (b) | Styrene | 25–85 |
| (c) | Acrylonitrile | 10–47 | wherein 5 to 95 parts of the total styrene and acrylonitrile are graft polymerized in the presence of the butadiene polymer and 0 to 90 parts of the total styrene and acrylonitrile are present as homopolymers or copolymers of those monomers.

The composition of the polymers is illustrated by the area ABCD in FIG. 1 and by the area ABCD in FIG.

2. The composition should preferably be within the area A′BCD. The quantities indicated represent here the optimum range. In FIGS. 1 and 2, U is the percentage of grafting base (butadiene polymer), V is the percentage of styrene, W is the percentage of acrylonitrile, X is the percentage of combined styrene and acrylonitrile grafted on the grafting base and Y is the percentage of extending styrene-acrylonitrile copolymer.

The polybutadienes (or butadiene polymers) concerned in the present invention are either homopolymers of butadiene or butadiene copolymers with at least 80% by weight of homopolymerised butadiene. The butadiene copolymers primarily considered are those formed with other aliphatic conjugated diolefines with 4 to 6 carbon atoms as well as with copolymerisable monovinyl or monovinylidene monomers. There may be employed typical monomers, copolymerisable with butadiene, such as acrylonitrile, styrene, acrylates, methacrylates and isoprene. The proposed process yields the most favourable results when polybutadiene latices with average particle sizes below 0.4 micron are used as grafting base. Latices with average particle sizes of 0.08 to 0.4 micron can be obtained by processes known in principle, by polymerising the monomers in aqueous emulsions. The desired particle size may be adjusted for example by varying the water-monomer ratio and the quantity of the emulsifier.

The styrene to be employed as graft monomer according to the process of the invention can be replaced partly or entirely by its homologues, such as α-methylstyrene. Similarly, the acrylonitrile can in principle be replaced by homologues such as methacrylonitrile. This applies both to the graft polymerisation and to the case where separately prepared thermoplastic polymers are added.

The polymerisation of the grafting base (polybutadiene) can be carried out at a pH from 2 to 12. The preferred pH-range is from 7 to 11. Expediently, the polymerisation is carried out at temperatures, from 20 to 100° C., preferably at temperatures in the range from 40 to 80° C.

The polymerisation of the butadiene can be interrupted before achieving a complete conversion. Complete conversion of the monomer is, however, preferred, producing a substantially cross-linked polymer; the gel-content (i.e., the portion insoluble in toluene) is then above 70%. In this instance, the deformation-hardness of the polymer will exceed 1000, while the Mooney-plasticity will be above 70.

Unreacted monomers, especially butadienes, are removed by agitation under reduced pressure, by blowing-out with nitrogen or by steam distillation.

The graft-polymerisation process according to the invention is carried out in the following manner.

An emulsion is prepared from the polybutadiene latex, the monomers to be grafted—especially styrene and acrylonitrile—the emulsifier and, if desired, water. The preparation of the emulsion does not require any special measures; in general, the styrene and the acrylonitrile are emulsified to begin with in a previously prepared aqueous solution of the emulsifier. This monomer-emulsion is then mixed with the polybutadiene latex. From 10 to 25%, but not substantially more than 30%, of the monomer-polymer emulsion thus prepared is then introduced into a suitable polymerisation vessel, heated to polymerisation temperature and mixed with the polymerisation catalyst. The remaining 75 to 90% of the emulsion is then added after the onset of polymerisation, continuously and at a rate corresponding to the rate of polymerisation.

If desired, the correspondence between the monomer-feed rate and the rate of polymerisation is checked by sampling at equal time intervals, to ascertain whether there is any substantial excess or lack of material in the reaction vessel. The graft-polymerisation is carried out in the pH-range from 2 to 11, preferably 7 to 10, and at temperatures from 40 to 80° C. The concentration normally employed is such that the latex formed has a solids content from 20 to 50%.

Preferably the emulsifiers employed for both the preparation of the graft base and for the graft-copolymerisation will not have emulsifying properties when in the form of free acid, i.e., for example salts of long-chain carboxylic acids with 10 to 20 carbon atoms, such as stearic acid, oleic acid, dimeric oleic acid or disproportionated abietic acid. Other emulsifiers can, however, be used in principle, e.g., salts of alkyl-sulphonates and sulphates, reaction products of 5 to 20 mols of ethylene oxide with 1 mol of fatty alcohol having 10 to 20 carbon atoms or 1 mol of an alkyl-phenol. Cation-active compounds, such as salts of stearylamine, can also be used.

Inorganic or organic peroxidic-compounds or azo-compounds, such as water-soluble persulphates like potassium or ammonium persulphate, organic hydroperoxides e.g., tert.-butyl-hydroperoxide, cumenehydroperoxide, p-menthane-hydroperoxide or azo-diisobutyric acid nitrile, which are used in conventional amounts of 0.5 to 5%, calculated on the total monomers present may be used as polymerisation catalysts both for the preparation of the butadiene polymer and for the graft-polymerisation. It is also possible to employ redox-systems, formed from the aforementioned peroxy-compounds with reducing agents, especially on the base of acids of sulphur in less than its maximum valency state, such as bisulphites, pyrosulphites, Na-formaldehyde-sulphoxylate and organic bases such as triethanolamine.

The usual long-chain mercaptans, e.g. n- or tert.-dodecylmercaptan can be employed as molecular-weight regulators.

The separate preparation of a styrene-acrylonitrile copolymer to be added subsequently is carried out according to methods known per se. Expediently, the same emulsifiers, catalysts and regulators are employed and the same conditions are employed as in the preparation of the graft polymers described above.

The mixture of the styrene-acrylonitrile copolymer component (A) with the graft-polymer component (B) can be coagulated according to known methods, by mixing the latex-mixture with strong electrolytes or acids and, if desired, heating it to temperatures from 80 to 100° C. The nature of the coagulant employed will depend upon the type of emulsifier present in the mixture. In the presence of emulsifiers active in both the acid and alkaline range (alkyl sulphates and sulphonates), strong electrolytes such as sodium chloride, calcium chloride or aluminum sulphate will be used. In the presence of emulsifiers which lose their activity in the acid range, the addition of relatively small amounts of acid, e.g. hydrochloric acid or acetic acid, suffices to effect coagulation. It is also possible to bring about the coagulation of the mixture by cooling it to temperatures below 0° C. ("freeze-out").

The powdery or granular polymer mixture obtained after separation by filtration or centrifuging and drying can be consolidated on roller mills, kneaders or apparatus having similar effects at temperatures of 140 to 180° C. and processed into granules in the conventional manner; pigments, dyestuffs, release agents, plasticizers and similar can be added before or during this process.

The products of the process can be shaped into the most diverse objects by the methods normally employed for processing thermoplastic moulding compositions. Thus, for example, the granular material can be worked into shaped parts on injection moulding machines. Profiles, plates and tubes can be produced from the granular material with the aid of screw-extruders; further, the plates can be formed into housings, containers or shells, by vacuum processes.

The process described above will now be explained in detail in the following examples, wherein, unless otherwise indicated, the parts mentioned are parts by weight.

Preparation of the polybutadiene latices (grafting-base).—Polybutadiene latices with mean particle sizes of 0.15 to 0.4 micron (0.2 to 0.3 micron).

An emulsion consisting of

| | Parts |
|---|---|
| Butadiene | 100 |
| Salt-free water | 56.0 |
| Sodium salt of disproportionated abietic acid | 0.5 |
| Potassium persulphate | 0.3 |
| n-Sodium hydroxide | 1.5 |
| n-Dodecyl-mercaptan | 0.4 | is polymerized at 60 to 65° C. in a stainless-steel pressure vessel with an anchor-shaped stirrer. At 20, 40, 60 and 80% conversion there are added further,

| | Parts |
|---|---|
| Emulsifier | 2.0 |
| Salt-free water | 15 |
| n-Sodium hydroxide | 0.5 | in equal portions. Polymerisation was practically complete after 45 to 60 hours. The 51 to 55% polybutadiene latices (90 to 97% conversion) were freed from excess butadiene by agitation under reduced pressure.

The following mean particle diameters were measured in various latices with the aid of the ultracentrifuge:

| Latex: | Microns |
|---|---|
| a | 0.20 |
| b | 0.18 |
| c | 0.225 |
| d | 0.251 |
| e | 0.304 |

Polybutadiene latex, with particle sizes below 0.15 micron

A polybutadiene latex with an average particle size of 0.08 micron (measured with the ultracentrifuge) is prepared in a stirrer-equipped pressure-vessel by emulsion-polymerisation of 100 parts of butadiene, 199.5 parts of water (desalted), 4.0 parts of sodium stearate, 0.5 part of N-sodium hydroxide, 0.35 part of n-dodecylmer-captane and 0.3 part of potassium persulphate, at a polymerisation temperature of 55 to 60° C. The solids content of the latex is 32.6%. (Latex f.)

Example 1.—Graft-polymerisation 1463 parts of the above-obtained 51.3% polybutadiene latex (=latex a, 750 parts of solid polymer) are emulsified in an aqueous emulsion, consisting of 2035 parts demineralised water, 42.8 parts of the sodium salt of disproportionated abietic acid, 124.5 parts of normal sodium hydroxide and 750 parts of a monomer mixture composed of 540 parts of styrene and 210 parts of acrylonitrile. 1000 parts of this emulsion are then introduced into a glass polymerisation vessel equipped with stirrer, reflux condenser, thermometer and dropping funnel, containing a solution of 7.5 parts of potassium persulphate in 500 parts of demineralised water. After driving off the air with nitrogen, the mixture is heated to 60 to 65° C. and, when polymerisation starts, the remaining 3415.3 parts of the above-described emulsion are run in over 4 hours. The mixture is then stirred for further 4 hours to complete the polymerisation. The graft-polymer latex obtained has a concentration of 29.4%.

Extending

The graft-polymer latex thus obtained is mixed with a separately-prepared styrene-acrylonitrile copolymer latex of 70% of styrene, 30% of acrylonitrile (K-value 59 (see Fikentscher, Cellulosechemie, volume 13, 1932)) so that for every 35 parts of graft-polymer there are 65 parts of styrene-acrylonitrile resin. After introduction of a commercially-available anti-aging agent, e.g., 2,2'-methylene - bis - 4-methyl-6-cyclohexylphenol, the latex mixture is coagulated by pouring it into an equal volume of 1% aqueous acetic acid and heating it to 85° C. The coagulum is washed and dried in vacuo at 70 to 80° C.

The dried powdery or granular coagulum is then consolidated into a sheet on a roller mill heated to 160° C. and this rolled sheet is subsequently granulated. Standard rods or spirals are prepared from the granular material by injection moulding which, on testing, yield the technical data listed in Table I.

Comparative Example A

In contrast to Example 1, the graft polymer is prepared by a different method. The mixing with the styrene-acrylonitrile resin component (70% styrene, 30% acrylonitrile, K-value 59) and the subsequent processing are carried out in the manner described in Example 1. The technological data of this moulding composition are listed in Table I under A.

Preparation of the graft-polymer 1463 parts of the polybutadiene latex already described in Example 1 and a solution of 7.5 parts of potassium persulphate in 2069 parts demineralised water are placed in a glass polymerisation vessel, equipped with stirrer, reflux condenser, thermometer and two dropping funnels. After flushing with pure nitrogen, the whole is heated at 60 to 65° C. and a monomer mixture, consisting of 540 parts of styrene and 210 parts of acrylonitrile, as well as a solution made up of 465 parts of demineralised water, 124.5 parts of normal sodium hydroxide and 42.7 parts of the sodium salt of disproportionated abietic acid are run in at a uniform rate over four hours.

After completion of the addition, the stirring is continued for another four hours at 65° C. to complete the polymerisation. The graft-polymer latex so obtained has a concentration of 29.9%.

Comparative Example B

In this example, the graft-polymer component of Example 1 is prepared by mixing together polybutadiene-latex, graft-monomers, water, emulsifier, normal sodium hydroxide and potassium persulphate in the amounts indicated and the mixture is polymerised in a "single-step" process. At the end of the usual supplementary stirring period of 4 hours at 65° C., the resulting graft-polymer latex has a concentration of 29.9%.

The mixing with the styrene-acrylonitrile copolymer latex (70% styrene, 30% acrylonitrile, K-value 59) is carried out in the same manner and with the same quantities as in Example 1.

The subsequent working-up and processing are likewise carried out in the manner described in Example 1. The technological data of this plastic composition are listed in Table I, under B.

Example 2

2300 g. of the above-described polybutadiene latex (f) (0.08 micron) are emulsified in an aqueous emulsion consisting of 1196 parts of demineralised water, 42.7 parts of the sodium salt of disproportionated abietic acid, 124.5 parts of normal sodium hydroxide and 750 parts of a monomer-mixture composed of 540 parts of styrene and 210 parts of acrylonitrile. 1000 parts of this emulsion are then introduced into the already described polymerisation vessel, containing a solution of 7.5 parts of potassium persulphate in 500 parts of demineralised water. After displacing the air by nitrogen, the whole is heated to 60 to 65° C. and, after the onset of the polymerisation reaction, the remaining 3813.2 parts of the above emulsion are added at a uniform rate over four hours. The graft-polymer latex thus obtained has a final concentration of 30.4%.

Comparative Example C 2300 parts of the above-mentioned polybutadiene latex (f), together with a solution of 7.5 parts of potassium persulphate in 1231 parts of demineralised water are introduced into the already repeatedly described glass polymerisation vessel. After flushing with nitrogen, the mixture is heated to 60 to 65° C. Then, a monomer mixture, composed of 540 parts of styrene and 210 parts of acrylonitrile and an emulsifier-solution, composed of 465 parts of demineralised water, 42.7 parts of the sodium salt of disproportionated abietic acid and 124.5 parts of normal sodium hydroxide is added at a uniform rate, over 4 hours. After completing the polymerisation by stirring for further 4 hours at 65° C., there is obtained a 30.8% graft-polymer latex.

Preparation of the graft-latex, Comparative Example D

Using the same polybutadiene latex as in Comparative Example C and in the same amounts as there indicated, a mixture is prepared from polybutadiene latex, graft-monomers, water, emulsifier, normal sodium hydroxide and potassium persulate and polymerised in a "single-step" process. After the usual supplementary stirring of 4 hours at 65° C., the graft-polymer latex thus obtained has a concentration of 29.9%.

The graft-polymer latices thus obtained are then extended with a separately-prepared styrene-acrylonitrile copolymer latex (70% styrene, 30% acrylonitrile, K-value 59) so that for every 35 parts of graft-polymer there are 65 parts of styrene acrylonitrile resin. After incorporation of the anti-aging material, e.g., 2,2'-methylene-bis-4-methyl-6-cyclohexylphenol, the latex mixtures are worked up and processed, in each case as already described in Example 1.

The standard rods and spirals prepared by injection moulding from the respective granular materials show the technological and mechanical properties listed in Table I under 2, C and D.

The length of the spirals (in cm.) prepared under constant moulding conditions is a criterion of the processibility, i.e. of the flow properties of the material.

The surface gloss is evaluated on the spirals.

merisation vessel—see Example 1—containing a solution of 7.5 parts of potassium persulphate in 267 parts of demineralised water. After displacing the air with nitrogen, the reaction mixture is heated to 60 to 65° C. and, after the onset of the polymerisation reaction, the remainder of the emulsion is fed in at a uniform rate over 4 hours. The graft-polymer latex thus prepared has a concentration of 32.6% after completing the reaction. (The polybutadiene:styrene:acrylonitrile ratio in the graft-polymer obtained is 17.5:59.3:23.1). After stabilisation, the graft-polymer latex is coagulated with 1% acetic acid, and the plastic composition thus obtained is worked up and processed in the manner described in Example 1.

The mechanical and technological data determined on standard rods and spirals are listed in Table II under 3.

Comparative Example E

The method of Example 3 is modified by placing the whole of the polybutadiene latex in the polymerisation vessel at the outset and dispensing with the emulsion feed.

440 parts of the polybutadiene-latex (a) described in Example 1 and a solution of 7.5 parts of potassium persulphate in 2561 parts of demineralised water are introduced into the glass polymerisation vessel described in the previous examples. After flushing with pure nitrogen, the mixture is heated to 60–65° C. Then, in the course of 4 hours, a monomer-mixture consisting of 891 parts of styrene, 346 parts of acrylonitrile and 4.5 parts of tert.-dodecyl-mercaptan, as well as an emulsifier solution composed of 465 parts of demineralised water, 42.8 parts of the sodium salt of disproportionated abietic acid and 124.5 parts of normal sodium hydroxide are run in at a uniform rate. After 4 hours' further stirring

TABLE I

| Experiment | 1 | A | B | 2 | C | D |
|---|---|---|---|---|---|---|
| Polybutadiene, average particle size of the polybutadiene d₅₀ in microns | 0.20 | 0.20 | 0.20 | 0.08 | 0.08 | 0.08 |
| Graft-polymerisation process: | | | | | | |
| 1. Emulsion feed=EZ | EZ | | | EZ | | |
| 2. Monomer feed =MZ | | MZ | | | MZ | |
| 3. Single-step process =E | | | E | | | E |
| Graft-polymer, styrene/acrylonitrile:polybutadiene ratio | 50:50 | 50:50 | 50:50 | 50:50 | 50:50 | 50:50 |
| Extending: | | | | | | |
| Graft-polymer portion | 35 | 35 | 35 | 35 | 35 | 35 |
| Styrene-acrylonitrile co-polymer portion, styrene:Acrylonitrile= 70:30; K-value 59 | 65 | 65 | 65 | 65 | 65 | 65 |
| Parts polybutadiene in the mixture | 17.5 | 17.5 | 17.5 | 17.5 | 17.5 | 17.5 |
| Notched impact strength, kp./cm.²; DIN 53 453 at— | | | | | | |
| 20° C | 13.8 | 3.8 | 11.9 | 13.1 | 3.1 | 5.0 |
| −20° C | 8.3 | | 6.3 | 7.5 | | |
| Indentation hardness, kp./cm.²; 60° DIN-proposal 53 456 | 900 | 920 | 900 | 890 | 900 | 895 |
| Spirals in cm.¹ | 69 | 60 | 62 | 70 | 68 | 60 |
| Gloss | (²) | (²) | (³) | (³) | (⁴) | (³) |

¹ For spiral test see W. Hechelhammer & W. Bachofen, Kunststoffe, 1957, p. 389.
² Glossy.
³ Mat.
⁴ Transparent, glossy.

As the table shows, the polymers prepared according to the process of the invention (Examples 1 and 2) posess both a good notch impact strength and a good workability. If the polybutadiene latex employed as graft base has an average particle size over 0.15 micron, the products prepared according to the invention will have glossy surfaces.

Example 3

510 parts of the 51.3% polybutadiene latex (a) (=262 parts solid polymer) described in Example 1 are emulsified in an emulsion composed of 2485 parts of demineralised water, 30 parts of the sodium salt of disproportionated abietic acid, 90 parts of normal sodium hydroxide and 1237 parts of a monomer-mixture consisting of 891 parts of styrene, 346 parts of acrylonitrile and 45 parts of tert.-dodecyl mercaptan. 1000 parts of this emulsion are then introduced into a polyat 65° C. there is obtained a 30.8% polymer latex. The proportions of polybutadiene, styrene and acrylonitrile in this graft-polymer are again 17.5:59:23.1. The working-up and further processing of this graft-polymer is carried out in the manner described in the previous examples. The standard rods and spirals prepared from this moulding composition by injection moulding show the mechanical and technological data listed in Table II under E.

Example 3A 832 parts of the polybutadiene latex (f) already employed in the Comparative Examples C and D (average particle diameter 0.08 micron) are emulsified into an aqueous emulsion consisting of 1930 parts of demineralised water, 26.2 parts of dimerised linoleic acid, 99.2 parts of normal NaOH and 1237 parts of a monomer-mixture composed of 891 parts of styrene and 346 parts of acrylonitrile with 4.5 parts of tert.-dodecylmercaptane.

1000 parts of this emulsion are then introduced into the previously described glass polymerisation vessel which already contains a solution of 7.5 parts of potassium persulphate in 500 parts of demineralised water. After driving off the air with nitrogen, the reaction mixture is heated to 60 to 65° C. and, after the onset of the polymerisation reaction, the remainder of the emulsion is run in at a uniform rate over 4 hours. After completion of the polymerisation, the graft-polymer latex thus obtained has a concentration of 32.8%. The proportions of polybutadiene, styrene and acrylonitrile are 17.5:59.3:23.1.

After incorporation of a commercially-available anti-aging substance, the graft-polymer latex is coagulated by pouring it into an equal volume of 1% acetic acid and heating to 85° C. The working-up and the further processing are carried out in the manner described in Example 1. The standard rods and spirals prepared from these moulding compositions by injection moulding show the mechanical and technological properties listed in Table II under 3A.

Comparative Example G

If, while employing the same quantities of materials, the same polybutadiene latex (f) and observing the same reaction conditions as in Example 3A, the graft-polymerisation is carried out by placing the whole of the polybutadiene latex in the polymerisation vessel at the outset and adding the graft-monomers, regulators and emulsifier-solution at a uniform rate over 4 hours, then there will be obtained, after working-up and processing, a moulding composition which has the mechanical and technological data listed in Table II under G. The relative proportions of polybutadiene, styrene and acrylonitrile are again 17.5:59.4:23.1.

Example 1. The rods and spirals prepared from the granulated moulding composition by injection moulding show the technological properties listed in Table III under 4.

Comparative Example H

If, instead of the graft-polymer latex employed in Example 4, there is used the graft-polymer latex prepared under the conditions of Comparative Example A, mixing this graft-polymer latex in the same manner and with the same quantities as in Example 4, then a moulding composition will be obtained having the technological properties listed in Table III uhder H.

TABLE III

| | Experiment | |
|---|---|---|
| | Example 4 | Comparative Example H |
| Polybutadiene, average particle size $d_{50}$ in microns | 0.20 | 0.20 |
| Graft-polymerisation process: | | |
| 1. Emulsion feed=EZ | EZ | |
| 2. Monomer feed=MZ | | MZ |
| Graft-polymer, styrene/acrylonitrile to butadiene ratio | 50:50 | 50:50 |
| Graft-polymer portion | 55 | 55 |
| Styrene-acrylonitrile copolymer portion, styrene: acrylonitrile=70:30 K-value 59 | 45 | 45 |
| Parts polybutadiene in the mixture | 27.5 | 27.5 |
| Notched impact strength, kp./cm./cm.² DIN 53 453 at— | | |
| 20° C | 19.0 | 7.5 |
| −20° C | 10.0 | |
| Indentation hardness, kp./cm.² 60" DIN-proposal 53 456 | 705 | 630 |
| Spirals in cm.[1] | 67 | 65 |
| Gloss | (²) | (²) |

[1] See footnote 1, Table I.
[2] Glossy.

TABLE II

| Experiment | 3 | E | 3A | G |
|---|---|---|---|---|
| Polybutadiene, average particle size $d_{50}$ in microns | 0.20 | 0.20 | 0.08 | 0.08 |
| Graft polymerisation process: | | | | |
| 1. Emulsion feed=EZ | EZ | | EZ | |
| 2. Monomer feed=MZ | | MZ | | MZ |
| 3. Single-step process=E | | | | |
| Graft-polymer, styrene/acrylonitrile:butadiene | 82.5:17.5 | 82.5:17.5 | 82.5:17.5 | 82.5:17.5 |
| Mixing: | | | | |
| Graft-polymer portion | 100 | 100 | 100 | 100 |
| Copolymer portion, styrene-acrylonitrile=70:30; K-value: 59 | | | | |
| Parts polybutadiene in the graft-polymer | 17.5 | 17.5 | 17.5 | 17.5 |
| Notched impact strength in kp./cm./cm.²; DIN 53 453 at — | | | | |
| 20° C | 12.0 | 2.5 | 15.0 | 1.9 |
| −20° C | 5.6 | | 7.5 | |
| Indentation hardness, kp./cm.² 60" DIN-proposal 53 456 | 890 | 990 | 840 | 9200 |
| Spirals in cm.[1] | 89 | 90 | 84 | 90 |
| Gloss | (²) | (²) | (³) | (⁴) |

[1] See footnote 1, Table I.
[2] Glossy.
[3] Mat.
[4] Transparent, glossy.

The experiments listed in this table also show that a combination of good notch bar impact strength *and* good processibility can be obtained only by applying the process of the invention. In addition, glossy surfaces are obtained with particles sizes above 0.15 micron.

Example 4

5760 parts of the graft-polymer of Example 1 are mixed with 3150 parts of a 44.2% latex of a copolymer with a K-value according to Fikentscher of 59.3 and an intrinsic viscosity of 0.80–0.71, formed from 72 parts styrene and 28 parts acrylonitrile. Thus, for 55 parts of graft-polymer there are 45 parts of styrene-acrylonitrile resin. The relative proportions of styrene, acrylonitrile and polybutadiene are then 52.2:20.3:27.5. After addition of a commercially-available anti-ageing material the working-up and processing are carried out in the manner described in The advantages of the process according to the invention are clearly shown.

Example 5

803 parts of the polybutadiene latex (a) described in Example 1 (51.3%) are emulsified in an aqueous emulsion composed of 2159 parts of demineralised water, 30 parts of the sodium salt of disproportionated abietic acid, 90 parts of normal NaOH, 1087 parts of a monomer mixture consisting of 782 parts of styrene and 305 parts of acrylonitrile, and 3 parts of tert.-dodecylmercaptan. 1000 parts of this emulsion are then introduced into a polymerisation vessel containing a solution of 7.5 parts of potassium persulphate in 500 parts of demineralised water. The graft-polymerisation is carried out in the manner described in Example 2. (The relative proportions of polybutadiene, styrene and acrylonitrile in the finished graft-polymer are 27.5:52.2:20.3). After stabilisation, the graft-polymer latex thus obtained is coagulated by pouring it into an equal volume of 1% acetic acid. The resulting moulding composition is worked up and processed as in the previous examples. The mechanical and technological data of this moulding composition, determined on standard rods and spirals, are listed in Table IV under 5.

Comparative Example J

As a modification of the process of Example 5, the whole of the polybutadiene latex is placed in the polymerisation vessel at the outset and a monomer feed is carried out instead of the emulsion feed. The relative proportions of polybutadiene, styrene and acrylonitrile are again 27.5:52.2:20.3.

803 parts of the polybutadiene latex of Example 1 (average particle size 0.20 micron, measured with the ultracentrifuge), together with a solution of 7.5 parts of potassium persulphate in 2209 parts of demineralised water are introduced into the glass polymerisation vessel previously described. After flushing with pure nitrogen, the mixture is heated to 60 to 65° C. and, over 4 hours, a mixture of 782 parts of styrene, 305 parts of acrylonitrile and 3 parts of tert.-dodecylmercaptan, as well as an emulsifier-solution made up of 450 parts of demineralised water, 30 parts of the sodium salt of disproportionated abietic acid and 30 parts of normal sodium hydroxide are added at a uniform rate. After stirring for a further 4 hours at 65° C., there is obtained a 32.5% graft polymer latex, which is worked up and processed in the usual manner after stabilising, without any further mixing. After consolidation and granulation, the test bodies prepared from this moulding composition by injection moulding display the technological properties indicated in Table IV under J.

TABLE IV

| | Experiment | |
|---|---|---|
| | Example 5 | Comparative Example J |
| Polybutadiene, average particle size d₅₀ in microns | 0.20 | 0.20 |
| Graft. polymerisation process: | | |
| 1. Emulsion feed=EZ | EZ | |
| 2. Monomer feed=MZ | | MZ |
| Graft-polymer, ratio of styrene/acrylonitrile to polybutadiene | 72.5/27.5 | 72.5/27.5 |
| Graft-polymer portion | 100 | 100 |
| Copolymer portion, styrene/acrylonitrile 70:30 K-value 59 | | |
| Parts polybutadiene in graft-polymer | 27.5 | 27.5 |
| Notched impact strength kp./cm./cm.² DIN 53 453 at— | | |
| 20° C | 18.8 | 8.5 |
| −20° C | 9.3 | 3.5 |
| Indentation hardness kp./cm.² DIN-proposal 53 456 | 665 | 650 |
| Spirals in cm.¹ | 69 | 65 |
| Gloss | (²) | (²) |

¹ See footnote 1, Table I.
² Glossy.

Example 6

Using the same polybutadiene latex (a) (average particle size 0.20 micron) and employing emulsion feed, the same graft polymer latex is prepared as in Example 1. The ratio of polybutadiene to graft-monomers is again 1:1. In contrast to Example 1, however, this graft-polymer is not blended with a separately prepared styrene-acrylonitrile resin (styrene:acrylonitrile ratio 70:30), but is directly processed into a moulding composition. After consolidation and granulation, the test bodies prepared from this moulding composition by the injection moulding process showed the technological data listed in Table V under 6.

Comparative Example K

Using the same polybutadiene latex (a) (average particle diameter 0.20 micron) and employing the same grafting process as described in Comparative Example A, i.e., monomer and emulsifier feed, a graft-polymer latex is prepared as in Comparative Example A. The polybutadiene:graft-monomer ratio is again 1:1. This graft-polymer is likewise processed into a moulding composition in analogy to Example 6. After consolidation, and granulation, the test bodies prepared from this moulding composition by the injection moulding process displayed the technological properties listed in Table V under K.

TABLE V

| | Experiment | |
|---|---|---|
| | Example 6 | Comparative Example K |
| Polybutadiene, average particle diameter d₅₀ in microns | 0.20 | 0.20 |
| Graft-polymerisation process: | | |
| 1. Total-emulsion feed=EZ | EZ | |
| 2. Monomer feed=MZ | | MZ |
| Graft-polymer, styrene-acrylonitrile: polybutadiene | 50:50 | 50:50 |
| Graft-polymer portion | 100 | 100 |
| Copolymer portion, styrene: acrylonitrile= 70:30; K-value 59 | | |
| Parts polybutadiene in the graft-polymer | | |
| Notched impact strength kp./cm./cm.² DIN 53 453 at— | | |
| 20° C | 11.0 | 5.0 |
| −20° C° | 8.5 | |
| Indentation hardness, kp./cm.² 60° DIN-proposal 53 456 | 350 | 312 |
| Spirals in cm.¹ | 61 | 60 |

¹ See footnote 1, Table I.

This example also indicates the clear superiority of the process according to the invention.

Example 7

Using the same polybutadiene latex and employing the same grafting process (emulsion-feed), a graft polymer latex is prepared as described in Example 1 and is mixed with a separately-prepared styrene-acrylonitrile copolymer latex so that, for every 10 parts of graft polymer there are 90 parts of styrene-acrylonitrile resin. The further processing is carried out in the same manner as in Example 1. The test bodies prepared from this moulding composition by the injection moulding process show the mechanical values listed in Table VI under 7.

COMPARATIVE EXAMPLES 8–11

In analogy to Example 1, graft-polymers are prepared from the polybutadiene latices b, c, d, and e by grafting on styrene-acrylonitrile by the emulsion-feed process; there being 36 parts of styrene and 14 parts of acrylonitrile for 50 parts of polybutadiene in each instance.

If the graft-polymers thus prepared are subsequently mixed with a separately-prepared styrene-acrylonitrile copolymer (70% styrene, 30% acrylonitrile; K-value 59) so that for every 35 parts of graft-polymer there are 65 parts of styrene-acrylonitrile resin, then, after working-up and processing as in Example 1, moulding compositions with the technological properties listed in Table VI under 8, 9, 10 and 11 are obtained.

TABLE VI

|  | Examples | | | | |
|---|---|---|---|---|---|
|  | 7 | 8 | 9 | 10 | 11 |
| Polybutadiene, avg. particle diameter $d_{50}$ in microns | 0.20 | 0.180 | 0.225 | 0.221 | 0.304 |
| Graft-polymerisation: | | | | | |
| 1. Emulsion feed=EZ | EZ | EZ | EZ | EZ | EZ |
| 2. Monomer feed=MZ | | | | | |
| Graft-polymer, styrene-acrylonitrile:polybutadiene ratio | 50:50 | 50:50 | 50:50 | 50:50 | 50:50 |
| Mixing: | | | | | |
| Graft-polymer portion | 10 | 35 | 35 | 35 | 35 |
| Styrene-acrylonitrile copolymer portion, styrene:acrylonitrile=70:30; K-value 59 | 90 | 65 | 65 | 65 | 65 |
| Parts polybutadiene in the mixture | 5 | 17.5 | 17.5 | 17.5 | 17.5 |
| Notched impact strength, kp./cm./cm.², DIN 53 453 at— | | | | | |
| 20° C | 4.0 | 21.0 | 16.3 | 20.6 | 14.4 |
| −20° C | 2.5 | 9.4 | 8.8 | 8.1 | 6.9 |
| Indentation hardness, kp./cm.², 60″, DIN 53 456 | 1,260 | 900 | 865 | 870 | 890 |
| Spirals in cm.[1] | 93 | 75 | 77 | 74 | 78 |
| Gloss | (²) | (²) | (²) | (²) | (²) |

[1] See footnote 1, Table I.
[2] Glossy.

We claim:

1. A process for producing a thermoplastic-elastic moulding composition comprising in polymerized form Percent by weight
   (a) Polybutadiene _____ 5–50
   (b) Styrene _____ 25–85
   (c) Acrylonitrile _____ 10–47 which comprises forming an emulsion containing polybutadiene latex, styrene and acrylonitrile within the above proportions, initiating polymerization with up to 30% of said emulsion and continuing said polymerization by adding the balance of said emulsion to resulting polymerizate at a rate corresponding to the rate of polymerization.

2. The process of claim 1 wherein the polybutadiene latex employed has an average particle size of below 0.4 micron.

3. The process of claim 1 wherein the polybutadiene latex employed has an average particle size of from 0.15 to 0.4 micron.

4. The process of claim 1 wherein the polybutadiene latex is a butadiene-homopolymer latex.

5. The process of claim 1 wherein the resulting composition contains less than 85% by weight of polymerized styrene and less than 47% by weight of polymerized acrylonitrile and it is admixed with additional styrene-acrylonitrile copolymer to provide an extended composition having a composition, in polymerized form, of 5 to 50% by weight of polybutadiene, 25 to 85% by weight styrene and 10 to 47% by weight acrylonitrile.

6. A product produced by the process of claim 1.

References Cited

UNITED STATES PATENTS 3,288,887  11/1966  Yoshino et al. _____ 260—880

MURRAY TILLMAN, *Primary Examiner.*

C. J. SECCURO, *Assistant Examiner.*

U.S. Cl. X.R.

260—29.7, 94.4, 876